United States Patent
You et al.

(10) Patent No.: US 11,940,694 B2
(45) Date of Patent: Mar. 26, 2024

(54) MANUFACTURING METHOD OF LIGHT MODULATION DEVICE

(71) Applicant: LG Chem, Ltd., Seoul (KR)

(72) Inventors: Jung Sun You, Daejeon (KR); Dong Hyun Oh, Daejeon (KR); Cheol Min Yun, Daejeon (KR); Jin Hong Kim, Daejeon (KR); Jung Woon Kim, Daejeon (KR); Min Jun Gim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 35 days.

(21) Appl. No.: 17/770,203

(22) PCT Filed: Nov. 4, 2020

(86) PCT No.: PCT/KR2020/015269
§ 371 (c)(1),
(2) Date: Apr. 19, 2022

(87) PCT Pub. No.: WO2021/091207
PCT Pub. Date: May 14, 2021

(65) Prior Publication Data
US 2022/0390779 A1    Dec. 8, 2022

(30) Foreign Application Priority Data
Nov. 4, 2019  (KR) .................. 10-2019-0139591

(51) Int. Cl.
*G02F 1/1337*  (2006.01)
*G02F 1/1339*  (2006.01)

(52) U.S. Cl.
CPC ........ *G02F 1/1337* (2013.01); *G02F 1/13394* (2013.01); *G02F 2202/28* (2013.01)

(58) Field of Classification Search
CPC .................... G02F 1/1337; G02F 2202/28
See application file for complete search history.

(56) References Cited

U.S. PATENT DOCUMENTS

| | | | |
|---|---|---|---|
| 2008/0123035 A1 | 5/2008 | Wu et al. |
| 2009/0289260 A1 | 11/2009 | Sonoda et al. |
| 2010/0157204 A1 | 6/2010 | Ichihashi et al. |
| 2013/0342798 A1 | 12/2013 | Miyake et al. |
| 2014/0340911 A1 | 11/2014 | Woo et al. |

(Continued)

FOREIGN PATENT DOCUMENTS

| | | |
|---|---|---|
| GB | 2324618 A | 10/1998 |
| JP | S61195187 A | 8/1986 |

(Continued)

OTHER PUBLICATIONS

Extended Search Report for Application No. 20883991.0 dated Nov. 24, 2022. 7 pgs.

(Continued)

*Primary Examiner* — Joseph L Williams
(74) *Attorney, Agent, or Firm* — Lerner David LLP

(57) ABSTRACT

A method for manufacturing a light modulation device is provided. The light modulation device is capable of removing defects such as orientation irregularities. The light modulation device further improves the orientation state in the light modulation device that adjusts orientation of a liquid crystal compound or the like with a liquid crystal alignment film and a pressure-sensitive adhesive layer or adhesive layer.

9 Claims, 8 Drawing Sheets

(56) References Cited

U.S. PATENT DOCUMENTS

| | | |
|---|---|---|
| 2018/0074377 A1 | 3/2018 | You et al. |
| 2019/0079327 A1 | 3/2019 | Kim et al. |
| 2019/0384094 A1 | 12/2019 | Lee et al. |

FOREIGN PATENT DOCUMENTS

| | | |
|---|---|---|
| JP | H06337405 A | 12/1994 |
| JP | H10301115 A | 11/1998 |
| JP | 2000338454 A | 12/2000 |
| JP | 2000346550 A | 12/2000 |
| JP | 2006323222 A | 11/2006 |
| JP | 2007057817 A | 3/2007 |
| JP | 2009229894 A | 10/2009 |
| JP | 2018507443 A | 3/2018 |
| KR | 0133915 B1 | 4/1998 |
| KR | 20100015481 A | 2/2010 |
| KR | 20150025726 A | 3/2015 |
| KR | 20160100575 A | 8/2016 |
| KR | 20170006084 A | 1/2017 |
| KR | 20170072573 A | 6/2017 |
| KR | 20180120316 A | 11/2018 |
| KR | 20190050577 A | 5/2019 |
| KR | 20190074513 A | 6/2019 |
| KR | 20190113645 A | 10/2019 |
| TW | 201418779 A | 5/2014 |
| WO | 2018199716 A1 | 11/2018 |

OTHER PUBLICATIONS

Search report from International Application No. PCT/KR2020/015269, dated Jan. 26, 2021.

Fig. 1

| 100 |
|---|
| 1001 |
| 600 |
| 2001 |
| 200 |

Fig. 2

| 400 |
|---|
| 100 |
| 1001 |
| 600 |
| 2001 |
| 200 |

Fig. 3

| 400 |
|---|
| 100 |
| 1001 |
| 600 |
| 2001 |
| 200 |
| 400 |

# MANUFACTURING METHOD OF LIGHT MODULATION DEVICE

CROSS REFERENCE TO RELATED APPLICATIONS

The present application is a national stage entry under 35 U.S.C. § 371 of PCT/KR2020/015269 filed on Nov. 4, 2020 and claims the benefit of the priority based on Korean Patent Application No. 10-2019-0139591 filed on Nov. 4, 2019, which is hereby incorporated by reference in its entirety.

TECHNICAL FIELD

The present application relates to a method for manufacturing a light modulation device.

BACKGROUND ART

Light modulation devices in which a light modulation layer including a liquid crystal compound or the like is positioned between substrates are used in various applications.

In order for the light modulation device to exhibit a performance suitable for its intended use, it is important to precisely control the orientation state of the liquid crystal compound between the substrates. In general, in order to control the orientation (especially initial orientation) of the liquid crystal compound, the device to which the liquid crystal compound is applied forms an alignment film on both surfaces of the two substrates facing each other.

Unlike the above, if a liquid crystal alignment film is formed only on one of the two substrates and a predetermined pressure-sensitive adhesive layer or adhesive layer is formed on the other substrate instead of the alignment film, it is possible to obtain the orientation state of the liquid crystal compound suitable for uses in (smart window) or eyewear by the surface action of the alignment film and the pressure-sensitive adhesive layer or adhesive layer.

DISCLOSURE

Technical Problem

In a light modulation device in which a liquid crystal alignment film is formed only on one of the two substrates and a pressure-sensitive adhesive layer or adhesive layer is formed on the other substrate, the surface damage by the specific surface characteristics of the adhesive or pressure-sensitive adhesive and shear force applied in the manufacturing process, and the like results in irregularities due to liquid crystal alignment abnormality.

It is the main purpose of the present application to remove defects such as orientation irregularities in a light modulation device having a structure in which a liquid crystal alignment film is formed only on one of two substrates and a pressure-sensitive adhesive layer or adhesive layer is formed on the other substrate instead of the alignment film.

The present application is intended to provide a manufacturing method that can further improve an orientation state in a light modulation device having a structure in which a liquid crystal alignment film is formed only on one of two substrates and a pressure-sensitive adhesive layer or adhesive layer is formed on the other substrate instead of the alignment film.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, or an error within about ±14 degrees, within about ±13 degrees, within about ±12 degrees, within about ±11 degrees, within about ±10 degrees, within about ±9 degrees, within about ±8 degrees, within about ±7 degrees, within about ±6 degrees, within about ±5 degrees, within about ±4 degrees, within about ±3 degrees, within about ±2 degrees, or about ±1 degree.

In this specification, the numerical value among terms defining angles includes an error such as a production error or a deviation (variation). Therefore, in this specification, the numerical value used while defining the angle may include an error within about ±15 degrees, or an error within about ±14 degrees, within about ±13 degrees, within about ±12 degrees, within about ±11 degrees, with about ±10 degrees, within about ±9 degrees, within about ±8 degrees, within about ±7 degrees, within about ±6 degrees, within about ±5 degrees, within about ±4 degrees, within about ±3 degrees, within about ±2 degrees or within about ±1 degree.

Among physical properties mentioned herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference and the refractive index mentioned herein mean a refractive index for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, any one of the angle measured in the clockwise direction and the angle measured in the counterclockwise direction may be represented as a positive number, and the other angle may be represented as a negative number.

The present application relates to a method for manufacturing a light modulation device. The term light modulation device may mean a device capable of switching between at least two or more different light states. The different light states may mean states in which at least transmittance, reflectance, color, and/or haze are different.

An example of the state that the light modulation device can implement includes a transparent, black, high reflection, low-reflection and/or color mode state indicating a specific color and the like, but is not limited thereto.

In one example, the light modulation device may be a device capable of switching between at least the transparent and black mode states, or a device capable of switching between the high reflection and low reflection mode states.

The transmittance of the light modulation device in the transparent mode may be at least 20% or more, 25% or more, 30% or more, 35% or more, 40% or more, 45% or more, 50% or more, 55% or more, 60% or more, 65% or more, 70% or more, 75% or more, or 80% or more or so.

The transmittance of the light modulation device in the black mode state may be 60% or less, 55% or less, 50% or less, 45% or less, 40% or less, 35% or less, 30% or less, 25% or less, 20% or less, 15% or less, 10% or less, or 5% or less. Since the higher the transmittance in the transparent mode state is, the more advantageous it is and the lower the transmittance in the black mode state is, the more advantageous it is, the upper limit of the transmittance in the transparent mode state and the lower limit of the transmittance in the black mode state are not particularly limited, where in one example, the upper limit of the transmittance in the transparent mode state may be about 100% and the lower limit of the transmittance in the black mode state may be about 0%.

In one example, in the light modulation device capable of switching between the transparent mode state and the black mode state, the difference between the transmittance in the transparent mode state and the transmittance in the black mode state (transparent mode–black mode) may be 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The reflectance of the light modulation device in the high reflection mode state may be at least 10% or more, 15% or more, 20% or more, 25% or more, 30% or more, 35% or more, or 40% or more or so. In addition, in the low reflection mode state, the reflectance of the light modulation device may be 20% or less, 15% or less, 10% or less, or 5% or less. The higher the reflectance in the high reflectance mode is, the more advantageous it is and the lower the reflectance in the low reflectance mode is, the more advantageous it is, so that the upper limit of the reflectance in the high reflection mode state and the lower limit of the reflectance in the low reflection mode state are not particularly limited, where in one example, the reflectance in the high reflection mode state may be about 60% or less, 55% or less, or 50% or less, and the lower limit of the reflectance in the low reflection mode state may be about 0%.

In one example, in the light modulation device capable of switching between the low reflection mode state and the high reflection mode state, the difference between the reflectance in the high reflection mode state and the reflectance in the low reflection mode state (high reflection mode–low reflection mode) may be 5% or more, 10% or more, 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The above-mentioned transmittance and reflectance may be each transmittance or reflectance for any one wavelength in the visible light region, for example, any one wavelength in a range of about 400 to 700 nm or about 380 to 780 nm, or transmittance or reflectance for the entire visible light region, maximum or minimum transmittance or reflectance among the transmittance or reflectance for the entire visible light region, or an average value of the transmittance or an average value of the reflectance in the visible region.

The light modulation device of the present application may be designed to switch between at least two or more states of any one state selected from the transparent mode, black mode, high reflection mode, low reflection mode and color mode states, and another state. If necessary, other third different states or higher states rather than the above states may also be implemented.

The switching of the light modulation device may be controlled depending on whether or not an external signal, for example, a voltage signal is applied. For example, in a state of not applying an external signal such as a voltage, the light modulation device may maintain any one of the above-described states, and then may be switched to another state when a voltage is applied. The state of the mode may be changed or the third different mode state may also be implemented, by changing the intensity, frequency and/or shape of the applied voltage.

The light modulation device of the present application may comprise, as a basic unit, a light modulation film layer having two substrates disposed opposite to each other and a light modulation layer positioned between the substrates. FIG. 1 is a diagram showing one example of the light modulation film layer. As shown in the drawing, the light modulation film layer comprises a first substrate (100) and a second substrate (200) which are oppositely disposed. As shown in the drawing, a pressure-sensitive adhesive layer or adhesive layer is formed on one surface of the first substrate (100) (hereinafter, may be referred to as a first surface), a liquid crystal alignment film (2001) is formed on the surface of the other second substrate (200) (hereinafter, may be referred to as a first surface), and a light modulation layer (600) is positioned between the oppositely disposed first substrate (100) and second substrate (200). When the light modulation layer is a liquid crystal layer, a liquid crystal alignment film is usually formed on both surfaces of the first and second substrates (100, 200), but a pressure-sensitive adhesive layer or adhesive layer is formed on the first substrate (100) instead of the liquid crystal alignment film, and a liquid crystal alignment film is formed only on the second substrate (200), whereby the orientation state of the liquid crystal compound, which is very useful in a specific application (e.g., smart window or eyewear), can be obtained. Therefore, a liquid crystal alignment film may not be formed on the first substrate of the light modulation film layer of the present application. In addition, although not shown in the drawing, in any one of the first and second substrates of the light modulation film layer, a spacer for maintaining an interval (cell gap) between the first and second substrates is present. When the pressure-sensitive adhesive layer or adhesive layer (1001) is formed on the substrate (100), the pressure-sensitive adhesive layer or adhesive layer (1001) is attached to the spacer, thereby being capable of greatly improving lamination force between the first and second substrates.

In this specification, the first surface of the substrate means any one surface of the main surface of the substrate and the opposite surface, and the second surface means the other surface of the main surface of the substrate and the opposite surface.

As the substrate, a known substrate material may be used without particular limitation. For example, an inorganic substrate such as a glass substrate, a crystalline or amorphous silicon substrate or a quartz substrate, or a plastic substrate may be used as the substrate.

As the plastic substrate, a TAC (triacetyl cellulose) substrate; a COP (cycloolefin copolymer) substrate such as a norbornene derivative substrate; a PMMA (poly(methyl methacrylate)) substrate; a PC (polycarbonate) substrate; a PE (polyethylene) substrate; a PP (polypropylene) substrate; a PVA (polyvinyl alcohol) substrate; a DAC (diacetyl cellulose) substrate; a Pac (polyacrylate) substrate; a PES (poly ether sulfone) substrate; a PEEK (polyetherketon) substrate; a PPS (polyphenylsulfone), a PEI (polyetherimide) substrate; a PEN (polyethylenenaphthatlate) substrate; a polyester substrate such as a PET (polyethyleneterephtalate) substrate; a PI (polyimide) substrate; a PSF (polysulfone) substrate; a PAR (polyarylate) substrate or a substrate comprising an amorphous fluororesin or the like may be used, without being limited thereto. The thickness of such a substrate is not particularly limited, which may be selected within an appropriate range.

The light modulation layer present between the substrates is a functional layer capable of changing light transmittance, reflectivity, haze and/or color, etc., alone or in connection with other components, depending on whether or not an external signal is applied. Such a light modulation layer may be referred to as an active light modulation layer herein.

In this specification, the external signal may mean an external factor, for example, an external voltage or the like, which may affect the behavior of a material included in the light modulation layer, for example, a light modulation material. Therefore, a state without any external signal may mean a state without the application of an external voltage or the like.

In the present application, the type of the light modulation layer is not particularly limited as long as it has the above-described functions, and a known light modulation layer can be applied. The light modulation layer may be, for example, a liquid crystal layer, an electrochromic material layer, a photochromic material layer, an electrophoretic material layer, or a dispersed particle orientation layer.

In one example, the liquid crystal layer may be applied as the light modulation layer. The liquid crystal layer is a layer containing a liquid crystal compound. In this specification, the range of the term liquid crystal layer includes all layers containing a liquid crystal compound, and for example, as described below, a so-called guest host layer comprising a liquid crystal compound (liquid crystal host) and a dichroic dye, or a layer comprising other additives such as a chiral dopant together with a liquid crystal compound is also a kind of liquid crystal layer defined in this specification. The liquid crystal layer may be an active liquid crystal layer, and thus the liquid crystal compound may exist in the liquid crystal layer such that the orientation direction changes depending on whether or not an external signal is applied. As the liquid crystal compound, any kind of liquid crystal compound can be used as far as the orientation direction can be changed by application of an external signal. For example, a smectic liquid crystal compound, a nematic liquid crystal compound or a cholesteric liquid crystal compound can be used as the liquid crystal compound. Furthermore, the liquid crystal compound may be, for example, a compound which has no polymerizable group or crosslinkable group so that the orientation direction can be changed by application of an external signal.

The liquid crystal layer may comprise a liquid crystal compound whose dielectric constant anisotropy is positive or negative. The absolute value of the dielectric constant anisotropy of the liquid crystal can be appropriately selected in consideration of the object of the present application. The term dielectric constant anisotropy ($\Delta\varepsilon$) may mean a difference ($\varepsilon// - \varepsilon\perp$) between the horizontal dielectric permittivity ($\varepsilon//$) and the vertical permittivity ($\varepsilon\perp$) of the liquid crystal. In this specification, the term horizontal permittivity ($\varepsilon//$) means a dielectric constant value measured along the direction of an electric field in a state where a voltage is applied so that the director of the liquid crystal and the direction of the electric field by the applied voltage are substantially horizontal, and the vertical permittivity ($\varepsilon\perp$) means a dielectric constant value measured along the direction of an electric field in a state where a voltage is applied so that the director of the liquid crystal and the direction of the electric field by the applied voltage are substantially perpendicular.

The driving mode of the liquid crystal layer may be exemplified by, for example, a DS (dynamic scattering) mode, an ECB (electrically controllable birefringence) mode, an IPS (in-plane switching) mode, an FFS (fringe-field switching) mode, an OCB (optically compensated bend) mode, a VA (vertical alignment) mode, an MVA (multi-domain vertical alignment) mode, a PVA (patterned vertical alignment) mode, an HAN (hybrid aligned nematic) mode, a TN (twisted nematic) mode, an STN (super twisted nematic) mode or R-TN (reversed twisted nematic) mode, and the like.

The light modulation layer, which is a liquid crystal layer, may further comprise a dichroic dye in terms of controlling light transmittance-variable characteristics together with the liquid crystal compound. In this specification, the term dye may mean a material capable of intensively absorbing and/or deforming light in at least a part or all of the ranges within a visible light region, for example, within a wavelength range of 400 nm to 700 nm, and the term dichroic dye may mean a material capable of anisotropic absorption of light in at least a part or all of the ranges of the visible light region. Such a dye is known, for example, as an azo dye or an anthraquinone dye, and the like, but is not limited thereto.

In one example, the light modulation layer is a liquid crystal layer comprising liquid crystal and dichroic dyes, which may be a so-called guest host liquid crystal layer (guest host liquid crystal cell). The term GHLC layer may mean a functional layer that dichroic dyes are arranged together depending on arrangement of liquid crystals to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye.

The light modulation film layer comprising the guest host liquid crystal layer as the light modulation layer may function as an active polarization layer (active polarizer). In this specification, the term active polarization layer (active polarizer) may mean a functional element capable of controlling anisotropic light absorption depending on external signal application. Such an active polarization layer can be distinguished from a passive polarization layer, which is described below, having constant light absorption or light reflection characteristics regardless of the external signal application. The guest host liquid crystal layer can control the anisotropic light absorption for the polarized light in the direction parallel to the arrangement direction of dichroic dyes and the polarized light in the vertical direction by controlling the arrangement of liquid crystals and dichroic dyes. Since the arrangement of liquid crystals and dichroic dyes can be controlled by the application of the external signal such as a magnetic field or an electric field, the guest host liquid crystal layer can control anisotropic light absorption depending on the external signal application.

The liquid crystal layer, which is a light modulation layer, may also comprise a so-called chiral dopant together with the liquid crystal compound. Such a chiral dopant may induce orientation of a helical structure in the liquid crystal compound. The type of the chiral dopant that may be included is not particularly limited, and an appropriate chiral dopant may be selected from known types as needed. Also, the ratio of the chiral dopant is not particularly limited, but the chiral dopant may be included in a ratio that the ratio (d/p) of the thickness (d, cell gap) of the light modulation layer and the pitch (p) of the helical structure of the liquid crystal compound generated by the addition of the chiral dopant may be less than 1. In another example, the ratio (d/p) may be 0.95 or less, 0.9 or less, 0.85 or less, 0.8 or less, 0.75 or less, 0.7 or less, 0.65 or less, 0.6 or less, 0.55 or less, 0.5 or less, or 0.45 or less, or may be 0.05 or more, 0.1 or more, 0.15 or more, 0.2 or more, 0.25 or more, 0.3 or more, or 0.35 or more. Such a ratio (d/p) is linked to the orientation of the liquid crystal compound induced by the pressure-sensitive adhesive layer or adhesive layer and the liquid crystal alignment film, so that an orientation state suitable for the applied use can be derived.

The thickness of the light modulation layer (cell gap) may be appropriately selected in consideration of the purpose of the present application. In one example, the thickness of the light modulation layer may be 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. A device having a large difference in transmittance, reflectance, haze, and/or color according to the mode state in such a thickness can be implemented. The thicker the thickness, the difference can be realized, so that it is not particularly limited, but it may be generally about 30 μm or less, 25 μm or less, 20 μm or less, or 15 μm or less.

In the light modulation film layer, the type of the pressure-sensitive adhesive layer or adhesive layer formed on the first surface of the first substrate is not particularly limited. Various types of pressure-sensitive adhesives or adhesives known as a so-called OCA (optically clear adhesive) or OCR (optically clear resin) in the industry may induce suitable orientation of the liquid crystal compound in combination with the liquid crystal alignment film. As the pressure-sensitive adhesive or adhesive, for example, an acrylic, silicone-based, epoxy-based, or urethane-based pressure-sensitive adhesive or adhesive may be applied.

As the suitable pressure-sensitive adhesive or adhesive, a silicone-based pressure-sensitive adhesive or adhesive may be exemplified. The specific surface characteristics of the silicone-based pressure-sensitive adhesive or adhesive may induce the orientation state of the liquid crystal compound suitable for the purpose in combination with the liquid crystal alignment film (especially, vertical alignment film).

As the silicone-based pressure-sensitive adhesive or adhesive, a cured product of a curable silicone adhesive or pressure-sensitive adhesive composition (hereinafter, may be simply referred to as a curable silicone composition) may be used. The type of curable silicone composition is not particularly limited, and for example, a heat-curable silicone composition or an ultraviolet-curable silicone composition may be used.

In one example, the curable silicone composition is an addition-curable silicone composition, which may comprise (1) an organopolysiloxane containing two or more alkenyl groups in the molecule, and (2) an organopolysiloxane containing two or more silicon-bonded hydrogen atoms in the molecule. Such a silicone compound may form a cured product by an addition reaction, for example, in the presence of a catalyst such as a platinum catalyst.

The (1) organopolysiloxane comprises, as a main component constituting the silicone cured product, at least two alkenyl groups in one molecule. At this time, a specific example of the alkenyl group includes a vinyl group, an allyl group, a butenyl group, a pentenyl group, a hexenyl group or a heptenyl group, and the like, and a vinyl group of the foregoing is usually applied, but is not limited thereto. In the (1) organopolysiloxane, the bonding position of the alkenyl group as described above is not particularly limited. For example, the alkenyl group may be bonded to the end of the molecular chain and/or to the side chain of the molecular chain. In addition, in the (1) organopolysiloxane, the type of the substituent that may be included in addition to the above-described alkenyl may include an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group or a 3,3,3-trifluoropropyl group, and the like, and a methyl group or a phenyl group of the foregoing is usually applied, but is not limited thereto.

The molecular structure of the (1) organopolysiloxane is not particularly limited, which may also have any shape, such as linear, branched, cyclic, reticulated or linear with partially branched. One having a linear molecular structure among such molecular structures is usually applied, but is not limited thereto.

A more specific example of the (1) organopolysiloxane may include a dimethylsiloxane-methylvinylsiloxane copolymer blocking with trimethylsiloxane groups at both ends of the molecular chain, a methylvinylpolysiloxane blocking with trimethylsiloxane groups at both ends of the molecular chain, a dimethylsiloxane-methylvinylsiloxane-methylphenylsiloxane copolymer blocking with trimethylsiloxane groups at both ends of the molecular chain, a dimethylpolysiloxane blocking with dimethylvinylsiloxane groups at both ends of the molecular chain, a methyl vinylpolysiloxane blocking with dimethylvinylsiloxane groups at both ends of the molecular chain, a dimethylsiloxane-methylvinylsiloxane copolymer blocking with dimethylvinylsiloxane groups at both ends of the molecular chain, a dimethylsiloxane-methylvinylsiloxane-methylphenylsiloxane copolymer blocking with dimethylvinylsiloxane groups at both ends of the molecular chain, an organopolysiloxane copolymer comprising a siloxane unit represented by $R^1_2SiO_{2/2}$ and a siloxane unit represented by $R^1_2R^2SiO_{1/2}$ and a siloxane unit represented by $SiO_{4/2}$, an organopolysiloxane copolymer comprising a siloxane unit represented by $R^1_2R^2SiO_{1/2}$ and a siloxane unit represented by $SiO_{4/2}$, an organopolysiloxane copolymer comprising a siloxane unit represented by $R^1R^2SiO_{2/2}$ and a siloxane unit represented by $R^1SiO_{3/2}$ or a siloxane unit represented by $R^2SiO_{3/2}$, and a mixture of two or more of the foregoing, but is limited thereto. Here, $R^1$ is a hydrocarbon group other than an alkenyl group, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group, or a 3,3,3-trifluoropropyl group, and the like. In addition, here, $R^2$ is an alkenyl group, which may be, specifically, a vinyl group, an allyl group, a butenyl group, a pentenyl group, a hexenyl group or a heptenyl group, and the like.

In the addition-curable silicone composition, the (2) organopolysiloxane may serve to crosslink the (1) organopolysiloxane. In the (2) organopolysiloxane, the bonding position of the hydrogen atom is not particularly limited, which may be, for example, bonded to the end and/or side chain of the molecular chain. Also, in the (2) organopolysiloxane, the kind of substituents that may be included in addition to the silicon-bonded hydrogen atom is not particularly limited, which may include, for example, an alkyl group, an aryl group, an aralkyl group or a halogen-substituted alkyl group, and the like as mentioned in the (1) organopolysiloxane, and among these, a methyl group or a phenyl group is usually applied, but is not limited thereto.

The molecular structure of the (2) organopolysiloxane is not particularly limited, and may also have any shape, such as linear, branched, cyclic, reticulated, or linear with partially branched. One having a linear molecular structure among such molecular structures is usually applied, but is not limited thereto.

A more specific example of the (2) organopolysiloxane may include a methylhydrogenpolysiloxane blocking with trimethylsiloxane groups at both ends of the molecular chain, a dimethylsiloxane-methylhydrogen copolymer blocking with trimethylsiloxane groups at both ends of the molecular chain, a dimethylsiloxane-methylhydrogensiloxane-methylphenylsiloxane copolymer blocking with trimethylsiloxane groups at both ends of the molecular chain, a dimethylpolysiloxane blocking with dimethylhydrogensiloxane groups at both ends of the molecular chain, a dimethylsiloxane-methylphenylsiloxane copolymer blocking with dimethylhydrogensiloxane groups at both ends of the molecular chain, a methylphenylpolysiloxane blocking with dimethylhydrogensiloxane groups at both ends of the molecular chain, an organopolysiloxane copolymer comprising a siloxane unit represented by $R^1_3SiO_{1/2}$, a siloxane unit represented by $R^1_2HSiO_{1/2}$ and a siloxane unit represented by $SiO_{4/2}$, an organopolysiloxane copolymer comprising a siloxane unit represented by $R^1_2HSiO_{1/2}$ and a siloxane unit represented by $SiO_{4/2}$, an organopolysiloxane copolymer comprising a siloxane unit represented by $R^1HSiO_{2/2}$ and a siloxane unit represented by $R^1SiO_{3/2}$ or a siloxane unit represented by $HSiO_{3/2}$ and a mixture of two or more of the foregoing, but is not limited thereto. Here, $R^1$ is a hydrocarbon group other than an alkenyl group, which may be, specifically, an alkyl group such as a methyl group, an ethyl group, a propyl group, a butyl group, a pentyl group, a hexyl group or a heptyl group; an aryl group such as a phenyl group, a tolyl group, a xylyl group or a naphthyl group; an aralkyl group such as a benzyl group or a phenentyl group; a halogen-substituted alkyl group such as a chloromethyl group, a 3-chloropropyl group, or a 3,3,3-trifluoropropyl group, and the like.

The content of the (2) organopolysiloxane is not particularly limited as long as it is included to the extent that appropriate curing can be performed. For example, the (2) organopolysiloxane may be contained in an amount of 0.5 to 10 silicon-bonded hydrogen atoms per one alkenyl group contained in the (1) organopolysiloxane as described above. In such a range, curing can be sufficiently performed and heat resistance can be secured.

The addition-curable silicone composition may further comprise platinum or a platinum compound as a catalyst for curing. The specific type of this platinum or platinum compound is not particularly limited. The ratio of the catalyst may also be adjusted to a level that proper curing may be performed.

In addition, the addition-curable silicone composition may also comprise an appropriate additive required from the viewpoint of improving storage stability, handling properties and workability in an appropriate ratio.

In another example, the silicone composition may comprise, as a condensation-curable silicone composition, for example, (a) an alkoxy group-containing siloxane polymer; and (b) a hydroxyl group-containing siloxane polymer.

The (a) siloxane polymer may be, for example, a compound represented by Formula 1 below.

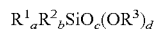

$$R^1_a R^2_b SiO_c(OR^3)_d \qquad \text{[Formula 1]}$$

In Formula 1, $R^1$ and $R^2$ each independently represent a hydrogen atom or a substituted or unsubstituted monovalent hydrocarbon group, $R^3$ represents an alkyl group, where when a plurality of $R^1$, $R^2$ and $R^3$ are present, they each may be the same or different from each other, and a and b each independently represent a number of 0 or more and less than 1, a+b represents a number of more than 0 and less than 2, c represents a number of more than 0 and less than 2, d represents a number of more than 0 and less than 4, and a+b+cX2+d is 4.

In the definition of Formula 1, the monovalent hydrocarbon may be, for example, an alkyl group having 1 to 8 carbon atoms, a phenyl group, a benzyl group or a tolyl group, and the like, where the alkyl group having 1 to 8 carbon atoms may be a methyl group, an ethyl group, a propyl group, an isopropyl group, a butyl group, a pentyl group, a hexyl group, a heptyl group or an octyl group, and the like. Also, in the definition of Formula 1, the monovalent hydrocarbon group may be substituted with a known substituent such as a halogen, an amino group, a mercapto group, an isocyanate group, a glycidyl group, a glycidoxy group or a ureido group.

In the definition of Formula 1, an example of the alkyl group of $R^3$ may include a methyl group, an ethyl group, a propyl group, an isopropyl group or a butyl group, and the like. Among these alkyl groups, a methyl group or an ethyl group, and the like is usually applied, but is not limited thereto.

Among the polymers of Formula 1, a branched or tertiary crosslinked siloxane polymer may be used. Furthermore, in this (a) siloxane polymer, a hydroxyl group may remain within a range that does not impair the object, specifically within a range that does not inhibit the dealcoholization reaction.

The (a) siloxane polymer may be produced, for example, by hydrolyzing and condensing a polyfunctional alkoxysilane or a polyfunctional chlorosilane, and the like. An average technician in this field can easily select an appropriate polyfunctional alkoxysilane or chlorosilane depending on the desired (a) siloxane polymer, and can also easily control the conditions of the hydrolysis and condensation reactions using the same. Meanwhile, in the production of the (a) siloxane polymer, an appropriate monofunctional alkoxy silane may also be used in combination depending on the purpose.

As the (a) siloxane polymer, for example, a commercially available organosiloxane polymer such as Shin-Etsu Silicone's X40-9220 or X40-9225, or GE Toray Silicone's XR31-B1410, XR31-B0270 or XR31-B2733 may be used.

As the (b) hydroxyl group-containing siloxane polymer contained in the condensation-curable silicone composition, for example, a compound represented by the following formula 2 may be used.

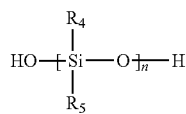

[Formula 2]

In Formula 2, $R^4$ and $R^5$ each independently represent a hydrogen atom or a substituted or unsubstituted monovalent hydrocarbon group, where when a plurality of $R^5$ and $R^6$ are present, they may be the same or different from each other, and n represents an integer of 5 to 2,000.

In the definition of Formula 2, the specific type of the monovalent hydrocarbon group may include, for example, the same hydrocarbon group as the case of Formula 1 above.

The (b) siloxane polymer may be produced, for example, by hydrolyzing and condensing dialkoxysilane and/or dichlorosilane, and the like. An average technician in this field can easily select an appropriate dialkoxysilane or dichlorosilane according to the desired (b) siloxane polymer, and can also easily control the conditions of the hydrolysis and condensation reactions using the same. As the (b) siloxane polymer as above, a commercially available bifunctional organosiloxane polymer, such as GE Toray Silicone's XC96-723, YF-3800 or YF-3804, and the like may be used.

The above-described addition-curing or condensation-curing silicone composition is an example of a material for forming the silicone pressure-sensitive adhesive or adhesive applied in the present application. That is, basically, all silicone pressure-sensitive adhesives or adhesives known as OCA or OCR, and the like in the industry can be applied in the present application.

The type of the pressure-sensitive adhesive or adhesive or the curable composition forming the same is not particularly limited, which may be appropriately selected according to the intended use. For example, a solid, semi-solid or liquid pressure-sensitive adhesive or adhesive or curable composition may be used. The solid or semi-solid pressure-sensitive adhesive or adhesive or curable composition may be cured before the adhesion object is bonded. The liquid pressure-sensitive adhesive or adhesive or curable composition is referred to as a so-called optical clear resin (OCR), which may be cured after the adhesion object is bonded. According to one example, as the pressure-sensitive adhesive or adhesive or curable composition, a so-called polydimethyl siloxane-based pressure-sensitive adhesive or adhesive or curable composition or polymethylvinyl siloxane-based pressure-sensitive adhesive or adhesive or curable composition or alkoxysilicone-based pressure-sensitive adhesive or adhesive or curable composition may be used, without being limited thereto.

The thickness of the pressure-sensitive adhesive layer or adhesive layer is not particularly limited, which may be selected in an appropriate range for securing a desired adhesion or cohesion. The thickness may be in the range of approximately 1 μm to 50 μm. In another example, the thickness may be 2 μm or more, 3 μm or more, 4 μm or more, 5 μm or more, 6 μm or more, 7 μm or more, 8 μm or more, 9 μm or more, or 10 μm or more, or may also be 45 μm or less, 40 μm or less, 35 μm or less, 30 μm or less, 25 μm or less, 20 μm or less, 15 μm or less, or 10 μm or less or so.

Also, the kind of the alignment film formed on the first surface of the second substrate is not particularly limited. That is, as the alignment film, a known vertical or horizontal alignment film or other alignment film may be applied in consideration of desired initial orientation. As for the type of the alignment film, a contact alignment film such as a rubbing alignment film or a non-contact alignment film such as a photo alignment film may be applied. In one example, a vertical alignment film may be used as the alignment film. The combination of the vertical alignment film and the pressure-sensitive adhesive layer or adhesive layer may induce an orientation state of a liquid crystal compound suitable for various uses.

The initial orientation of the liquid crystal compound formed by the pressure-sensitive adhesive layer or adhesive layer and the liquid crystal alignment film in the liquid crystal layer, which is a light modulation layer, may be vertical orientation, horizontal orientation, oblique orientation or spray orientation. Also, in the vertical orientation, horizontal orientation, oblique orientation or spray orientation state, the liquid crystal compound may or may not be twisted to exist in twisting orientation or cholesteric orientation. Here, the initial orientation means orientation in a state where an external signal such as a voltage is not applied to the light modulation layer comprising the liquid crystal compound.

The meaning of the horizontal orientation, oblique orientation, vertical orientation or spray orientation is as known in the art. While the liquid crystal compound of the light modulation layer maintains the horizontal orientation, oblique orientation, vertical orientation or spray orientation state in the initial state, it can be changed to the other orientation states according to an external signal.

In one example, the initial orientation of the liquid crystal compound in the light modulation layer may be vertical orientation or an orientation state similar to the vertical orientation. This orientation state is obtained by applying a vertical alignment film as the liquid crystal alignment film. This orientation is useful in an element that implements a so-called R-TN (reversed twisted nematic) orientation.

In addition, when the liquid crystal alignment film is a horizontal alignment film, it is useful in an element implementing a so-called ECB mode.

Therefore, the planar phase difference (based on a wavelength of 550 nm) of the light modulation layer in the vertical orientation or an orientation state similar to the vertical orientation may be, for example, about 30 nm or less, 25 nm or less, 20 nm or less, 15 nm or less, 10 nm or less, or 5 nm or less, or may be 0 nm or more, or more than 0 nm.

The planar phase difference (or in-plane phase difference) may be obtained according to Equation 1 below.

$$Rin = d \times (nx - ny) \qquad \text{[Equation 1]}$$

In Equation 1, Rin is a planar phase difference or in-plane phase difference, nx is the slow axis direction refractive index of the liquid crystal compound in the light modulation layer, ny is the fast axis direction refractive index of the liquid crystal compound in the light modulation layer, and d is the thickness of the light modulation layer.

The light modulation film layer may further comprise a spacer for maintaining an interval between the first and second substrates. As the spacer, a ball spacer, a column spacer or a partition spacer, which is a spacer that is commonly applied, may be applied. As the partition spacer, a honeycomb-shaped or tetragon-shaped partition spacer, or a random spacer may be applied. Here, when the shape of the partition spacer formed on the substrate is observed from the normal direction of the substrate, the honeycomb-shaped or tetragon-shaped partition spacer means the case where the FIG. formed by the partition spacer is a honeycomb type or a tetragon type, as is well-known. The honeycomb type is usually a combination of regular hexagons, and in the case of the tetragon type, there may be a square, a rectangle, or a combination of a square and a rectangle, and the like. In addition, here, the random spacer means a case where the partitions are arranged at random, wherein the relevant partitions do not form a FIG., or form a FIG. at random rather than a standard FIG., even if it is formed.

The pitch of the spacer may also be appropriately selected in consideration of the desired adhesion or cell gap maintaining efficiency, and the like. For example, when the partition spacer is applied, the pitch of the partition spacer may be in a range of 300 μm to 900 μm. In another example, the pitch may be 350 μm or more, 400 μm or more, 450 μm or more, 500 μm or more, or 550 μm or more, or may also be 850 μm or less, 800 μm or less, 750 μm or less, 700 μm or less, 650 μm or less, or 600 μm or less or so. The method of obtaining the pitch in the partition spacer is known. For example, if the partition spacer is a honeycomb type, the pitch is obtained through the interval of opposite sides in the hexagon forming the honeycomb, and in the case of a tetragon, the pitch is obtained through the length of the sides of the tetragon. In the case where the intervals of the sides facing each other in the hexagon forming the honeycomb or the lengths of the sides of the tetragon are not constant, an average value of them may be defined as the pitch.

Meanwhile, the line width of the partition spacer, for example, the width of each wall of the hexagon forming the honeycomb, or the tetragon, may be in a range of, for example, about 5 μm to 50 μm. In another example, the line width may be about 10 μm or more, or 15 μm or more, or may also be 45 μm or less, 40 μm or less, 35 μm or less, 30 μm or less, 25 μm or less, or 20 μm or less or so.

In the above range, the cell gap may be properly maintained, and adhesion between substrates may also be maintained excellently.

A method of forming the ball spacer, column spacer or partition spacer as above between substrates is known.

As a component for applying an external signal to the light modulation layer, an electrode layer may be formed on each substrate of the light modulation film layer. For example, the electrode layer may be present between the first surface and the pressure-sensitive adhesive or adhesive layer in the first substrate (between 100 and 1001 in FIG. 1) and/or between the first surface and the alignment film in the second substrate (between 200 and 2001 in FIG. 1) (if a spacer is present, between the spacer and the alignment film). In the case of the second substrate, it is common that first, an electrode layer is formed on the first surface, and a spacer and an alignment film are formed thereon sequentially, so that when a spacer is present, the electrode layer may be located between the first surface of the second substrate and the spacer and alignment film.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

The light modulation device may comprise other additional constitutions as necessary, while basically comprising the light modulation film layer. That is, depending on the driving mode, the implementation of the above-described transparent, black, high reflection and/or low reflection mode and switching between them are possible even with the light modulation film layer alone, but in order to facilitate the implementation or switching of these modes, it is also possible to include additional components.

For example, the device may further comprise a polarization layer (passive polarization layer) disposed on one side or both sides of the light modulation film layer. FIG. 2 is, as an example of the above structure, the case where in the structure of FIG. 1, the polarization layer (400) is disposed only on one side of the light modulation film layer, and FIG. 3 is the case where in the structure of FIG. 1, the polarization layer (400) is disposed on both sides of the light modulation film layer. In addition, when the partition spacer is applied as the spacer and the shape is a tetragon (square or rectangle), the sides of the tetragon and the absorption axis of the polarization layer are suitably disposed to be substantially vertical or horizontal to each other.

The term polarization layer may mean an element that converts natural light or unpolarized light into polarized light. In one example, the polarization layer may be a linear polarization layer. The linear polarization layer means a case where the selectively transmitting light is linearly polarized light that vibrates in any one direction and the selectively absorbing or reflecting light is linearly polarized light that vibrates in directions orthogonal to the vibration direction of the linearly polarized light. That is, the linear polarization layer may have a transmission axis and absorption axes or reflection axes orthogonal to each other in the plane direction.

The polarization layer may be an absorptive polarization layer or a reflective polarization layer. As the absorptive polarization layer, for example, a polarization layer in which iodine is dyed to a polymer stretched film such as a PVA stretched film, or a guest-host polarization layer in which liquid crystals polymerized in an oriented state are used as a host and dichroic dyes arranged along the orientation of the liquid crystals are used as a guest may be used, without being limited thereto.

As the reflective polarization layer, for example, a reflective polarization layer known as a so-called DBEF (dual brightness enhancement film) or a reflective polarization layer formed by coating a liquid crystal compound such as LLC (lyotropic liquid crystal) may be used, but is not limited thereto.

As shown in FIG. 3, it may have a structure in which the polarization layers are disposed on both sides of the light modulation film layer. In this case, the angle formed by the transmission axes of the polarization layers disposed on both sides may be in the range of 85 degrees to 95 degrees, or approximately perpendicular.

The light modulation device may comprise other necessary constitutions in addition to the above constitutions. For example, any other constitution necessary for driving or using the light modulation device, such as a pressure-sensitive adhesive layer or adhesive layer for attaching other components in addition to the pressure-sensitive adhesive layer or adhesive layer formed on the first surface of the first substrate, a hard coating film, an antireflection film and/or an NIR (near-infrared) cut layer, may be added.

The light modulation device of the present application can be applied to various applications. The applications to which the light modulation device can be applied can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

The present application relates to a method for manufacturing such a light modulation device, and as described above, the main content is to provide a light modulation device that in the light modulation device having a type of defining orientation using the alignment film and the pressure-sensitive adhesive layer or adhesive layer, the surface damage by the surface characteristics of the adhesive or pressure-sensitive adhesive and shear force applied in the manufacturing process, and the like is prevented from resulting in irregularities due to liquid crystal alignment abnormality, and orientation defects are removed.

The manufacturing method may comprise a step of laminating the first substrate having a first surface and a second surface, wherein a pressure-sensitive adhesive layer or adhesive layer is formed on the first surface, and the second substrate having a first surface and a second surface, wherein a spacer and an alignment film are formed on the first surface, so that their first surfaces face each other.

In the manufacturing method of the present application, an appropriate heat treatment may be performed before or after the laminating step or during the laminating step. Such a heat treatment can remove defects such as irregularities which occur in the light modulation device by controlling the surface characteristics of the adhesive layer or pressure-sensitive adhesive layer and/or the liquid crystal alignment film, and the like.

The heat treatment may be performed in any one of steps during the laminating step, before the laminating step and after the laminating step, may be performed in two steps of the foregoing, or may also be performed in all of the three steps.

In one example, when the heat treatment is performed before the laminating step, the heat treatment may be performed on both the first and second substrates, or may also be performed on at least the first substrate.

In this case, the heat treatment may be performed at an appropriate temperature for a predetermined time. For example, the heat treatment may be performed at a temperature of about 80° C. or higher. In another example, the heat treatment may be performed at about 85° C. or more, about 90° C. or more, about 95° C. or more, or about 100° C. or more, or may also be performed at about 200° C. or less, 190° C. or less, 180° C. or less, 170° C. or less, 160° C. or less, 150° C. or less, 140° C. or less, 130° C. or less, 120° C. or less, or 110° C. or less or so.

In addition, the heat treatment may be performed for about 30 seconds or more, 60 seconds or more, 90 seconds or more, 120 seconds or more, 150 seconds or more, 180 seconds or more, 210 seconds or more, 240 seconds or more, 270 seconds or more, or 300 seconds or more, or may be performed for a time of about 20 minutes or less, 18 minutes or less, 16 minutes or less, 14 minutes or less, 12 minutes or less, 10 minutes or less, 8 minutes or less, or 6 minutes or less or so.

The heat treatment may be performed by maintaining at least one of the first and second substrates for the time under the temperature condition.

When the heat treatment is performed during the laminating process, such a heat treatment may be performed by performing the laminating process at a predetermined temperature.

In this case, the laminating process may be performed at a temperature of, for example, more than about 50° C. In another example, the laminating process may be performed at about 51° C. or more, 52° C. or more, 53° C. or more, 54° C. or more, 55° C. or more, about 56° C. or more, about 57° C. or more, about 58° C. or more, about 59° C. or more, or about 60° C. or more, or may also be performed at less than about 90° C., about 89° C. or less, 88° C. or less, 87° C. or less, 86° C. or less, 85° C. or less, 84° C. or less, 83° C. or less, 82° C. or less, 81° C. or less, or 80° C. or less or so.

When the heat treatment is performed after the laminating step, such a heat treatment may be performed by maintaining the laminated first and second substrates at a predetermined temperature for a predetermined time.

For example, the heat treatment may be performed at an appropriate temperature for a predetermined time. For example, the heat treatment may be performed by maintaining the laminated first and second substrates at a temperature of about 60° C. or higher. In another example, the temperature of the heat treatment may be about 65° C. or more, about 70° C. or more, 75° C. or more, 80° C. or more, about 85° C. or more, about 90° C. or more, about 95° C. or more, or about 100° C. or more, or may also be about 200° C. or less, 190° C. or less, 180° C. or less, 170° C. or less, 160° C. or less, 150° C. or less, 140° C. or less, 130° C. or less, 120° C. or less, or 110° C. or less or so. The heat treatment may be performed for about 30 seconds or more, 60 seconds or more, 90 seconds or more, 120 seconds or more, 150 seconds or more, 180 seconds or more, 210 seconds or more, 240 seconds or more, 270 seconds or more, 300 seconds or more, or may be performed for 20 minutes or less, 18 minutes or less, 16 minutes or less, 14 minutes or less, 12 minutes or less, 10 minutes or less, 8 minutes or less, or 6 minutes or less or so.

In the manufacturing method, the step of peeling the release film attached to the pressure-sensitive adhesive layer or the adhesive layer before the lamination may also be performed. When the heat treatment is performed before the laminating step, the heat treatment may be performed before or after peeling of the release film.

In the manufacturing method of the present application, a step of first forming the pressure-sensitive adhesive layer or adhesive layer on the first surface of the first substrate and then attaching a release film to the surface to produce a laminate may be performed. The method of forming the pressure-sensitive adhesive layer or adhesive layer is not particularly limited, and a known method may be applied. For example, the above-described curable composition is applied on the first surface of the first substrate (applied on the electrode layer, if the electrode layer is formed on the first surface) and cured to form a pressure-sensitive adhesive layer or adhesive layer, or a method of forming the pressure-sensitive adhesive layer or adhesive layer on the release film in the above manner and then laminating it on the first surface may be applied.

In the present application, the defects due to poor orientation may be removed by controlling the surface energy of the pressure-sensitive adhesive layer or adhesive layer in the laminate thus formed or controlling the peel force of the release film.

For example, in the method, the surface energy of the pressure-sensitive adhesive layer or adhesive layer formed on the first surface of the first substrate may be 13 mN/m or less. In another example, the surface energy may be 12.5 mN/m or less, 12 mN/m or less, 11.5 mN/m or less, or 11 mN/m or less, or may also be 4 mN/m or more, 4.5 mN/m or more, 5 mN/m or more, 5.5 mN/m or more, 6 mN/m or more, 6.5 mN/m or more, 7 mN/m or more, 7.5 mN/m or more, 8 mN/m or more, 8.5 mN/m or more, 9 mN/m or more, 9.5 mN/m or more, or 10 mN/m or more or so. The surface energy may be obtained through a known method, and for example, a method of obtaining contact angles of deionized water and diiodomethane with respect to the pressure-sensitive adhesive layer or adhesive layer and then obtaining the surface energy using the Owens-Wendt method may be applied.

The method of setting the surface energy of the pressure-sensitive adhesive layer or adhesive layer as above is not particularly limited. That is, in the present invention, the surface energy may be secured by selecting and applying OCAs or OCRs, and the like that exhibits the above surface energy characteristics among known OCAs or OCRs. In addition, the surface energy of the pressure-sensitive adhesive layer or adhesive layer may be surface energy before attaching the release film, or surface energy after peeling the release film.

As described above, the applied pressure-sensitive adhesive layer or adhesive layer may be various OCAs or OCRs, and the like, and in one example, the pressure-sensitive adhesive layer or adhesive layer may be a silicone pressure-sensitive adhesive layer or adhesive layer.

Alternatively, the method of controlling the peel force of the release film in the laminate may also be applied. Here, the peel force is the peel force with respect to the pressure-sensitive adhesive layer or adhesive layer of the release film, which may be a peel angle measured while peeling the release film from the pressure-sensitive adhesive layer or adhesive layer at a peel angle of 90 degrees and a peel rate of 0.3 m/min. The peel force of the release film thus identified may be, for example, about 0.025 N/cm or less, 0.02 N/cm or less, or 0.015 N/cm or less, or may also be 0.005 N/cm or less, or 0.01 N/cm or less or so.

In the range of the peel force and/or surface energy, it is possible to manufacture a suitable light modulation device for the purpose of the present application.

The type of the above-applied release film is not particularly limited, and for example, a release film exhibiting the above-described peel force may be selected from known release films in which a fluorine-based or silicon-based release layer is formed on one side.

In the above step, the method of peeling the release film from the pressure-sensitive adhesive layer or adhesive layer is not particularly limited. For example, the release film may be peeled at a peel angle within a range of approximately 0 degrees to 90 degrees. In another example, the peel angle may be 5 degrees or more, 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, 60 degrees or more, 65 degrees or more, 70 degrees or more, 75 degrees or more, 80 degrees or more, or 85 degrees or more, or may also be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, 35 degrees or less, 30, 25 degrees or less, 20 degrees or less, 15 degrees or less, 10 degrees or less, or 5 degrees or less or so.

Also, the peel rate, at which the release film is peeled, is not particularly limited, but the release film may be peeled at a rate of, for example, about 0.5 m/min to 20 m/min.

As described above, the liquid crystal alignment film may not be formed on the first substrate, and the electrode layer may also be formed between the first surface of the first substrate and the pressure-sensitive adhesive layer or adhesive layer.

In the manufacturing method of the present application, the step of laminating the first surface of the first substrate and the first surface of the second substrate, from which the release films have been peeled, to face each other may be performed following the above step. As described above, the heat treatment may be performed on the first and/or second substrate before the laminating step, or the lamination may be performed at a predetermined temperature, or the heat treatment may be performed after the laminating step.

As described above, the second substrate has a first surface and a second surface, wherein a spacer and a liquid crystal alignment film may be formed on the first surface. Here, the spacer may be a ball spacer, a column spacer or a partition spacer (honeycomb or tetragon, etc.) as described above. In addition, the liquid crystal alignment film may be a horizontal alignment film or a vertical alignment film, where an electrode layer is formed between the first surface of the second substrate and the spacer and alignment film.

The method of laminating the first substrate and the second substrate is not particularly limited, which may be performed in a conventional manner, and for example, it may proceed by a method of applying an appropriate pressure and attaching the pressure-sensitive adhesive layer or adhesive layer of the first substrate to the spacer of the second substrate.

For formation of the light modulation layer, the liquid crystal compound may be present between the first substrate and the second substrate to be laminated, and if necessary, the dichroic dye and/or chiral dopant may be present. That is, the method may proceed by a process of coating the liquid crystal compound or the like on the surface of the first or second substrate before laminating the first and second substrates, and performing lamination, or injecting the liquid crystal compounds into the interval of the substrates after lamination.

For example, the lamination may be performed in a state where the liquid crystal compound or the like exists between the first and second substrates, or the liquid crystal compound or the like may be injected between the first and second substrates after the lamination. At this time, the liquid crystal compound or the like may mean only the liquid crystal compound, or may mean a mixture containing the liquid crystal compound and the dichroic dye, a mixture containing the liquid crystal compound and the chiral dopant or a mixture containing the liquid crystal compound, the dichroic dye and the chiral dopant.

In addition, when the light modulation device is manufactured such that the chiral dopant exists between the first and second substrates, the lamination process may be performed such that the ratio (d/p) of the interval (d) between the first and second substrates to the chiral pitch (p) formed by the chiral dopant is within the above-described range.

In the method for manufacturing a light modulation device of the present application, in order to implement the structure shown in FIG. 2 or 3, the step of disposing a polarization layer on the second surface of the first substrate and/or the second surface of the second substrate may be further performed following the laminating step. For example, the polarization layer may be attached to the second surface using an appropriate pressure-sensitive adhesive or adhesive.

As described above, in the case of disposing two polarization layers on the second surface of the first substrate and the second surface of the second substrate, the polarization layers may be disposed such that the mutual absorption axes of the two polarization layers are perpendicular or parallel to each other, and when a partition spacer in the form of a tetragon such as a square and a rectangle is applied, the polarization layers may be disposed such that the respective sides of the tetragon and the absorption axes of the polarization layers are perpendicular or parallel to each other.

In the method for manufacturing a light modulation device of the present application, other processes generally performed in processes of manufacturing a light modulation device may also be performed in addition to the above-describe contents.

Advantageous Effects

The present application can provide a method for manufacturing a light modulation device capable of removing defects such as orientation irregularities and further improving the orientation state in a light modulation device that adjusts orientation of a liquid crystal compound or the like with a liquid crystal alignment film and a pressure-sensitive adhesive layer or adhesive layer.

DESCRIPTION OF DRAWINGS

FIGS. 1 to 3 are schematic diagrams of exemplary light modulation devices of the present application.

MODE FOR INVENTION

Figure 4:
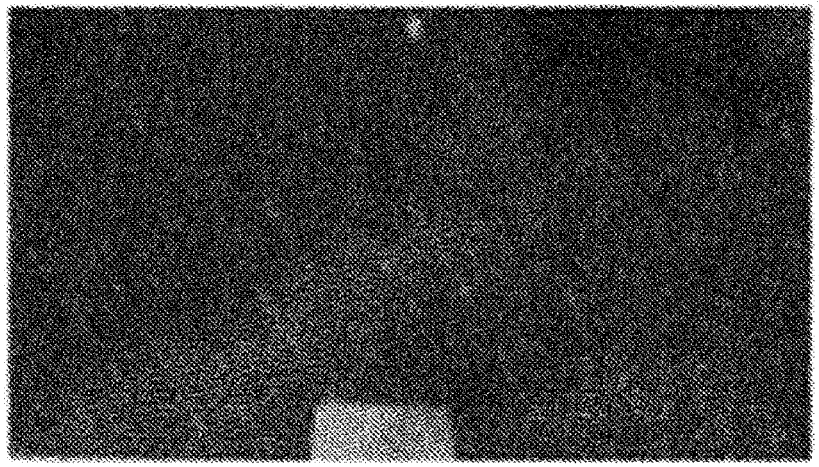
FIGS. 4 to 20 are results of evaluating defects of the light modulation devices of Examples or Comparative Examples.

Hereinafter, the present application will be described in detail through examples, but the scope of the present application is not limited by the following examples.

1. Surface Energy Evaluation of Pressure-Sensitive Adhesive Layer or Adhesive Layer After forming the pressure-sensitive adhesive, the surface energy was measured before attaching the release film. After obtaining contact angles of deionized water and diiodomethane with respect to the pressure-sensitive adhesive layer, the surface energy was obtained using the Owens-Wendt method, where KRUSS' measuring machine (DSA100) was used as a measuring instrument.

2. Peel Force Evaluation of Release Film

A first substrate having a width and a length of 20 mm and 100 mm, respectively, on which each silicone pressure-sensitive adhesive layer was formed on one side, was attached to a stage with a double-sided tape and fixed, and a release film was attached on the pressure-sensitive adhesive layer. Then, the peel force was measured while peeling the release film at a peel angle of 90 degrees and a peel rate of 0.3 m/min. When measuring the peel force, Stable Micro System's texture analyzer was used.

Example 1

As the first substrate, a PET (poly(ethylene terephthalate)) film (SKC) having a thickness of 145 μm or so, wherein an ITO (indium tin oxide) layer was deposited on the first surface to a thickness of about 30 nm or so, was used. A silicone pressure-sensitive adhesive was formed on the ITO layer of the PET film. A silicone pressure-sensitive adhesive composition (Shinetsu, KR3700) was bar-coated and dried at about 150° C. or so for 5 minutes to form the pressure-sensitive adhesive to a thickness of 10 μm or so. After the pressure-sensitive adhesive layer was formed, a release film (Nippa, FSC6) was attached thereto. The peel force of the release film measured with respect to the formed pressure-sensitive adhesive layer was about 0.29 to 0.33 N/cm or so.

As the second substrate, a PET (poly(ethylene terephthalate)) film (SKC) having a thickness of about 145 μm or so, wherein an ITO (indium tin oxide) layer was deposited on the first surface to a thickness of about 30 nm or so, was used. First, as honeycomb-type spacers, partition spacers, in which the regular hexagon constituting the honeycomb had a pitch of about 577 μm or so, a height (cell gap) of about 8 μm or so, and a line width of about 20 μm or so, were formed on the ITO layer of the PET film, and a vertical alignment film (5661LB3, Nissan) was formed on the formed spacers to a thickness of about 300 nm or so. The vertical alignment film was formed by rubbing it in one direction.

Subsequently, the liquid crystal composition was coated on the surface of the vertical alignment film of the second substrate, and the pressure-sensitive adhesive layer exposed by peeling the release film from the first substrate was laminated to face the coated surface of the liquid crystal composition.

After the lamination, the laminated first and second substrates were heat-treated. The heat treatment was performed by placing the laminated first and second substrates in an oven, and was performed at about 60° C. for 10 minutes.

Also, the release film was peeled at a peel angle of about 45 degrees and a peel rate of 1 m/min or so.

In addition, here, as the liquid crystal composition, a composition comprising a liquid crystal compound (JNC, SHN-7002XXT12) and a chiral dopant (Merck, 5811) was used, and the content of the chiral dopant was made to have a chiral pitch of about 20 μm or so.

Figure 5:
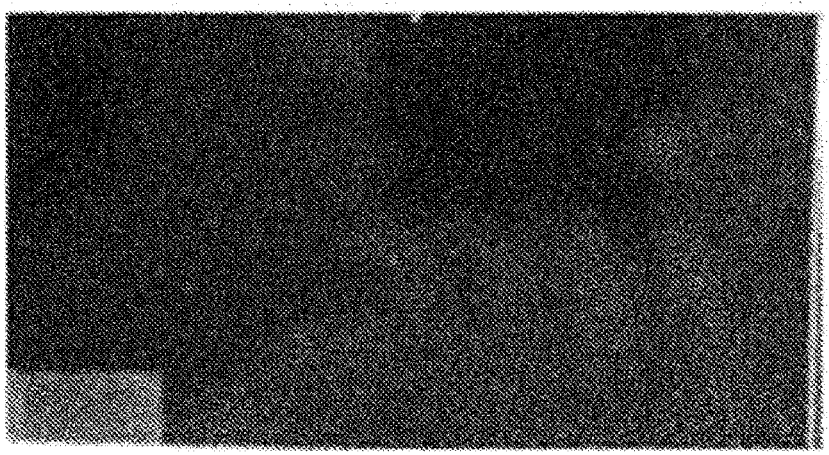

Thereafter, PVA (poly(vinyl alcohol)) polarization layers were attached to the second surfaces of the first and second substrates, respectively. The two polarization layers were attached so that their absorption axes were perpendicular to each other, and the absorption axis of the polarization layer attached to the second surface of the second substrate and the rubbing direction of the alignment film were consistent. After manufacturing the light modulation device as above, the manufactured light modulation device was placed on the backlight, and defects such as irregularities were confirmed through photographing. FIG. 4 is a photograph showing the result before heat treatment immediately after lamination of the first and second substrates, and FIG. 5 is a photograph showing the result after heat treatment. It can be confirmed from the drawings that the orientation irregularities and the like are improved by the heat treatment Example 2

Figure 6:

A light modulation device was manufactured in the same manner as in Example 1, except that the heat treatment was performed at 80° C. for 5 minutes. After manufacturing the light modulation device as above, the manufactured light modulation device was placed on the backlight, and defects such as irregularities were confirmed through photographing. FIG. 6 is a photograph showing the result, and it can be confirmed that orientation irregularities and the like are greatly improved by the heat treatment.

Example 3

Figure 7:
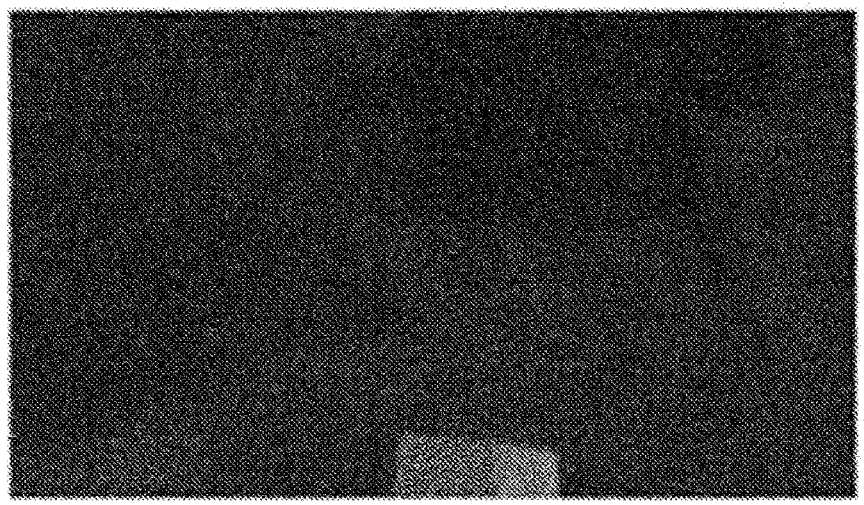

A light modulation device was manufactured in the same manner as in Example 1, except that the heat treatment was performed at 100° C. for 5 minutes. After manufacturing the light modulation device as above, the manufactured light modulation device was placed on the backlight, and defects such as irregularities were confirmed through photographing. FIG. 7 is a photograph showing the result, and it can be confirmed that orientation irregularities and the like are greatly improved by the heat treatment.

Example 4

As the first substrate, a PET (poly(ethylene terephthalate)) film (SKC) having a thickness of 145 μm or so, wherein an ITO (indium tin oxide) layer was deposited on the first surface to a thickness of about 30 nm or so, was used. A silicone pressure-sensitive adhesive was formed on the ITO layer of the PET film. A silicone pressure-sensitive adhesive composition (Shinetsu, KR3700) was bar-coated and dried at about 150° C. or so for 5 minutes to form the pressure-sensitive adhesive to a thickness of 10 μm or so. After the pressure-sensitive adhesive layer was formed, a release film (Nippa, FSC6) was attached thereto. The peel force of the release film measured with respect to the formed pressure-sensitive adhesive layer was about 0.29 to 0.33 N/cm or so.

As the second substrate, a PET (poly(ethylene terephthalate)) film (SKC) having a thickness of about 145 μm or so, wherein an ITO (indium tin oxide) layer was deposited on the first surface to a thickness of about 30 nm or so, was used. First, as honeycomb-type spacers, partition spacers, in which the regular hexagon constituting the honeycomb had a pitch of about 577 μm or so, a height (cell gap) of about 8 μm or so, and a line width of about 20 μm or so, were formed on the ITO layer of the PET film, and a horizontal alignment film (SE7492, Nissan) was formed on the formed spacers to a thickness of about 300 nm or so. The horizontal alignment film was formed by rubbing it in one direction.

Subsequently, the liquid crystal composition was coated on the surface of the horizontal alignment film of the second substrate, and the pressure-sensitive adhesive layer exposed by peeling the release film from the first substrate was laminated to face the coated surface of the liquid crystal composition.

After the lamination, the laminated first and second substrates were heat-treated in the same manner as in Example 1. In addition, the peeling of the release film was performed in the same manner as in Example 1.

Furthermore, here, as the liquid crystal composition, a liquid crystal compound (Merck, MDA-16-1235) composition was used.

Figure 8:
Figure 9:
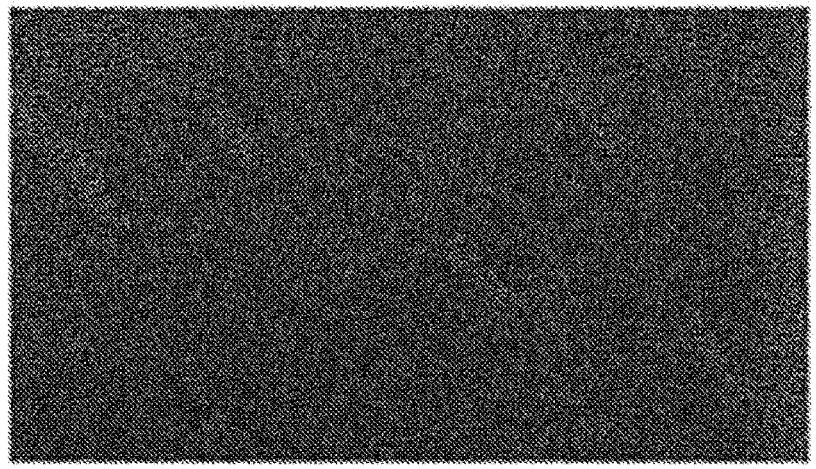

Thereafter, a PVA (poly(vinyl alcohol)) polarization layer was attached to the second surface of the second substrate. The polarization layer was made such that the absorption axis coincided with the rubbing direction of the alignment film. After the above fabrication, the fabricated light modulation device was placed on the backlight, and defects such as spots were confirmed through photographing. FIG. 8 is a photograph showing the result before heat treatment immediately after lamination of the first and second substrates, and FIG. 9 is a photograph showing the result after heat treatment. It can be confirmed from the drawings that the orientation irregularities and the like are improved by the heat treatment.

Example 5

Figure 10:

A light modulation device was manufactured in the same manner as in Example 4, except that the heat treatment was performed at 80° C. for 5 minutes. After manufacturing the light modulation device as above, the manufactured light modulation device was placed on the backlight, and defects such as irregularities were confirmed through photographing. FIG. 10 is a photograph showing the result, and it can be confirmed that orientation irregularities and the like are greatly improved by the heat treatment.

Example 6

Figure 11:

A light modulation device was manufactured in the same manner as in Example 4, except that the heat treatment was performed at 100° C. for 5 minutes. After manufacturing the light modulation device as above, the manufactured light modulation device was placed on the backlight, and defects such as irregularities were confirmed through photographing. FIG. 11 is a photograph showing the result, and it can be confirmed that orientation irregularities and the like are greatly improved by the heat treatment.

Example 7

As the first substrate, a PET (poly(ethylene terephthalate)) film (SKC) having a thickness of 145 μm or so, wherein an ITO (indium tin oxide) layer was deposited on the first surface to a thickness of about 30 nm or so, was used. A silicone pressure-sensitive adhesive was formed on the ITO layer of the PET film. A silicone pressure-sensitive adhesive composition (Shinetsu, KR3700) was bar-coated and dried at about 150° C. or so for 5 minutes to form the pressure-sensitive adhesive to a thickness of 10 μm or so. After the pressure-sensitive adhesive layer was formed, a release film (Nippa, FSC6) was attached thereto. The peel force of the release film measured with respect to the formed pressure-sensitive adhesive layer was about 0.29 to 0.33 N/cm or so.

As the second substrate, a PET (poly(ethylene terephthalate)) film (SKC) having a thickness of about 145 μm or so, wherein an ITO (indium tin oxide) layer was deposited on the first surface to a thickness of about 30 nm or so, was used. First, as honeycomb-type spacers, partition spacers, in which the regular hexagon constituting the honeycomb had a pitch of about 577 μm or so, a height (cell gap) of about 8 μm or so, and a line width of about 20 μm or so, were formed on the ITO layer of the PET film, and a vertical alignment film (5661LB3, Nissan) was formed on the formed spacers to a thickness of about 300 nm or so. The vertical alignment film was formed by rubbing it in one direction.

Subsequently, the liquid crystal composition was coated on the surface of the vertical alignment film of the second substrate, and the pressure-sensitive adhesive layer exposed by peeling the release film from the first substrate was laminated to face the coated surface of the liquid crystal composition.

Before the lamination, the first substrate, from which the release film was peeled, was heat-treated. The heat treatment was performed by placing the laminated first and second substrates in an oven, and was performed at about 100° C. for 5 minutes. Also, the release film was peeled at a peel angle of about 45 degrees and a peel rate of 1 m/min or so.

In addition, here, as the liquid crystal composition, a composition comprising a liquid crystal compound (JNC, SHN-7002XXT12) and a chiral dopant (Merck, 5811) was used, and the content of the chiral dopant was made to have a chiral pitch of about 20 μm or so.

Figure 12:
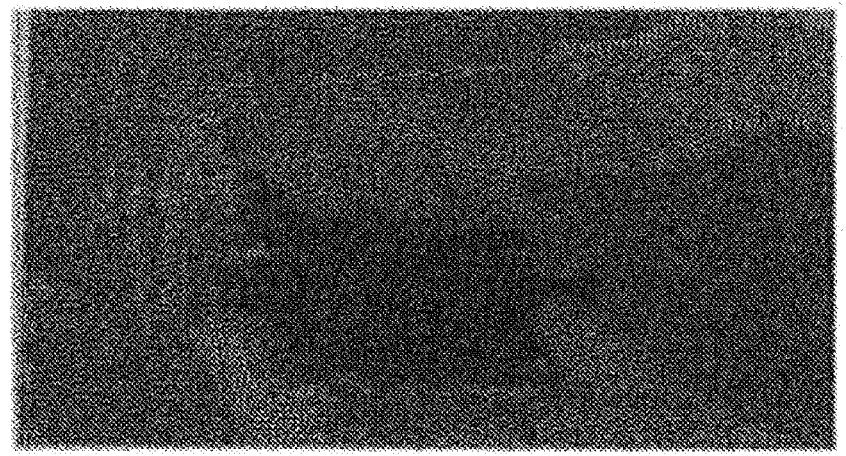

Thereafter, PVA (poly(vinyl alcohol)) polarization layers were attached to the second surfaces of the first and second substrates, respectively. The two polarization layers were attached so that their absorption axes were perpendicular to each other, and the absorption axis of the polarization layer attached to the second surface of the second substrate and the rubbing direction of the alignment film were consistent. After manufacturing the light modulation device as above, the manufactured light modulation device was placed on the backlight, and defects such as irregularities were confirmed through photographing. FIG. 12 is a photograph showing the result

Example 8

Figure 13:
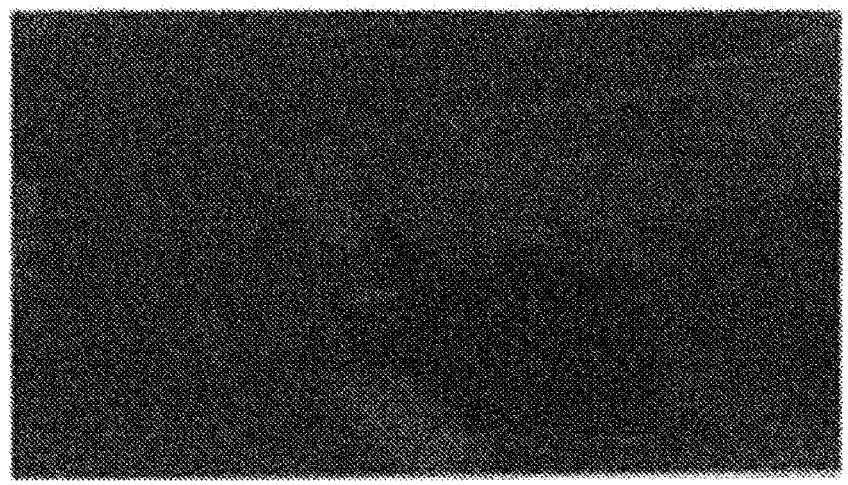

A light modulation device was manufactured in the same manner as in Example 7, except that TACS' TS-502S was used as the release film, and the heat treatment was performed at the same temperature for 5 minutes. The peel force of the release film to the pressure-sensitive adhesive layer was about 0.032 to 0.033 N/cm or so. After manufacturing the light modulation device as above, the manufactured light modulation device was placed on the backlight, and defects such as irregularities were confirmed through photographing. FIG. 13 is a photograph showing the result.

Comparative Example 1

Figure 14:
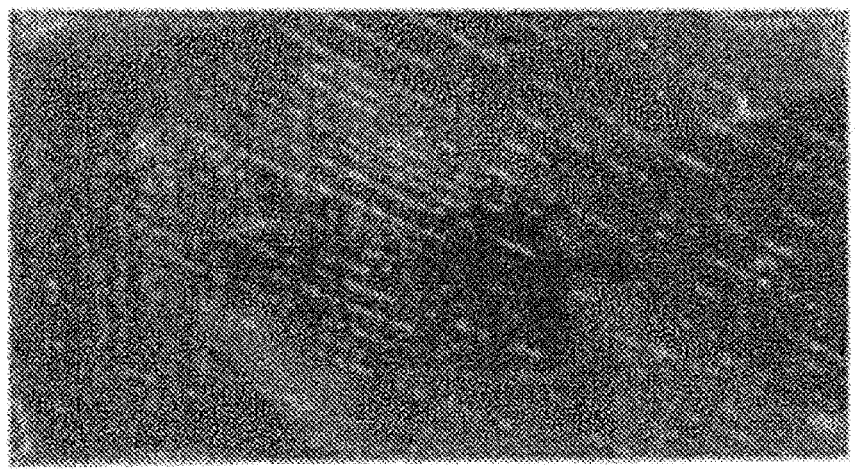

A light modulation device was manufactured in the same manner as in Example 8, except that the heat treatment was not performed. After manufacturing the light modulation device as above, the manufactured light modulation device was placed on the backlight, and defects such as irregularities were confirmed through photographing. FIG. 14 is a photograph showing the result.

Example 9

As the first substrate, a PET (poly(ethylene terephthalate)) film (SKC) having a thickness of 145 μm or so, wherein an ITO (indium tin oxide) layer was deposited on the first surface to a thickness of about 30 nm or so, was used. A silicone pressure-sensitive adhesive was formed on the ITO layer of the PET film. A silicone pressure-sensitive adhesive composition (Shinetsu, KR3700) was bar-coated and dried at about 150° C. or so for 5 minutes to form the pressure-sensitive adhesive to a thickness of 10 μm or so. After the pressure-sensitive adhesive layer was formed, a release film (Nippa, FSC6) was attached thereto. The peel force of the release film measured with respect to the formed pressure-sensitive adhesive layer was about 0.29 to 0.33 N/cm or so.

As the second substrate, a PET (poly(ethylene terephthalate)) film (SKC) having a thickness of about 145 μm or so, wherein an ITO (indium tin oxide) layer was deposited on the first surface to a thickness of about 30 nm or so, was used. First, as honeycomb-type spacers, partition spacers, in which the regular hexagon constituting the honeycomb had a pitch of about 577 μm or so, a height (cell gap) of about 8 μm or so, and a line width of about 20 μm or so, were formed on the ITO layer of the PET film, and a horizontal alignment film (SE7492, Nissan) was formed on the formed spacers to a thickness of about 300 nm or so. The horizontal alignment film was formed by rubbing it in one direction.

Subsequently, the liquid crystal composition was coated on the surface of the horizontal alignment film of the second substrate, and the pressure-sensitive adhesive layer exposed by peeling the release film from the first substrate was laminated to face the coated surface of the liquid crystal composition.

Before the lamination, the first substrate, from which the release film was peeled, was heat-treated. The heat treatment was performed by placing the first substrate in an oven, and was performed at about 100° C. for 5 minutes. Also, the peeling of the release film was performed in the same manner as in Example 1.

In addition, here, as the liquid crystal composition, a liquid crystal compound (Merck, MDA-16-1235) composition was used.

Figure 15:
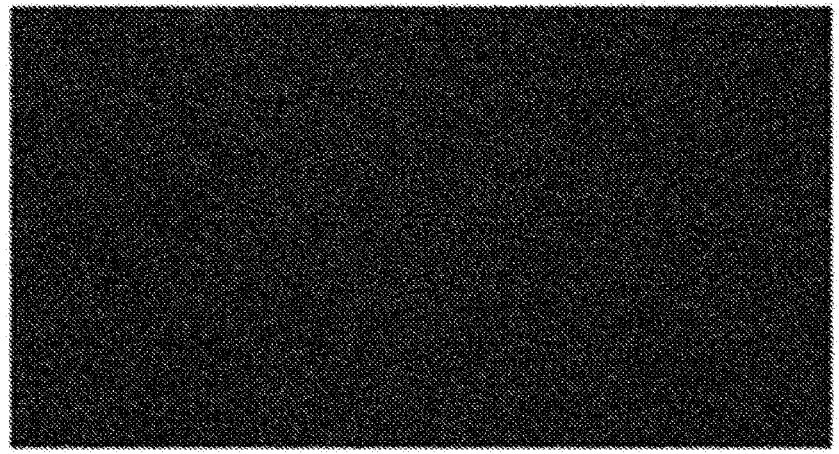

Thereafter, a PVA (poly(vinyl alcohol)) polarization layer was attached to the second surface of the second substrate. The polarization layer was made such that the absorption axis coincided with the rubbing direction of the alignment film. After manufacturing the light modulation device as above, the manufactured light modulation device was placed on the backlight, and defects such as irregularities were confirmed through photographing. FIG. 15 is a photograph showing the result

Example 10

Figure 16:

A light modulation device was manufactured in the same manner as in Example 9, except that as the release film, TACS Corporation's TS-502S was used and the heat treatment was performed for 5 minutes. The peel force of the release film to the pressure-sensitive adhesive layer was about 0.032 to 0.033 N/cm. After manufacturing the light modulation device as above, the manufactured light modulation device was placed on the backlight, and defects such as irregularities were confirmed through photographing. FIG. 16 is a photograph showing the result.

Example 11

As the first substrate, a PET (poly(ethylene terephthalate)) film (SKC) having a thickness of 145 μm or so, wherein an ITO (indium tin oxide) layer was deposited on the first surface to a thickness of about 30 nm or so, was used. A silicone pressure-sensitive adhesive was formed on the ITO layer of the PET film. A silicone pressure-sensitive adhesive composition (Shinetsu, KR3700) was bar-coated and dried at about 150° C. or so for 5 minutes to form the pressure-sensitive adhesive to a thickness of 10 μm or so. After the pressure-sensitive adhesive layer was formed, a release film (Nippa, FSC6) was attached thereto. The peel force of the release film measured with respect to the formed pressure-sensitive adhesive layer was about 0.29 to 0.33 N/cm or so.

As the second substrate, a PET (poly(ethylene terephthalate)) film (SKC) having a thickness of about 145 μm or so, wherein an ITO (indium tin oxide) layer was deposited on the first surface to a thickness of about 30 nm or so, was used. First, as honeycomb-type spacers, partition spacers, in which the regular hexagon constituting the honeycomb had a pitch of about 577 μm or so, a height (cell gap) of about 8 μm or so, and a line width of about 20 μm or so, were formed on the ITO layer of the PET film, and a vertical alignment film (5661LB3, Nissan) was formed on the formed spacers to a thickness of about 300 nm or so. The vertical alignment film was formed by rubbing it in one direction.

Subsequently, the liquid crystal composition was coated on the surface of the vertical alignment film of the second substrate, and the pressure-sensitive adhesive layer exposed by peeling the release film from the first substrate was laminated to face the coated surface of the liquid crystal composition. The lamination was performed at about 60° C. or so.

Also, the release film was peeled at a peel angle of about 45 degrees and a peel rate of 1 m/min or so.

In addition, here, as the liquid crystal composition, a composition comprising a liquid crystal compound (JNC, SHN-7002XXT12) and a chiral dopant (Merck, 5811) was used, and the content of the chiral dopant was made to have a chiral pitch of about 20 μm or so.

Thereafter, PVA (poly(vinyl alcohol)) polarization layers were attached to the second surfaces of the first and second substrates, respectively. The two polarization layers were attached so that their absorption axes were perpendicular to each other, and the absorption axis of the polarization layer attached to the second surface of the second substrate and the rubbing direction of the alignment film were consistent.

After manufacturing the light modulation device as above, the manufactured light modulation device was placed on the backlight, and defects such as irregularities were confirmed through photographing.

Figure 17:
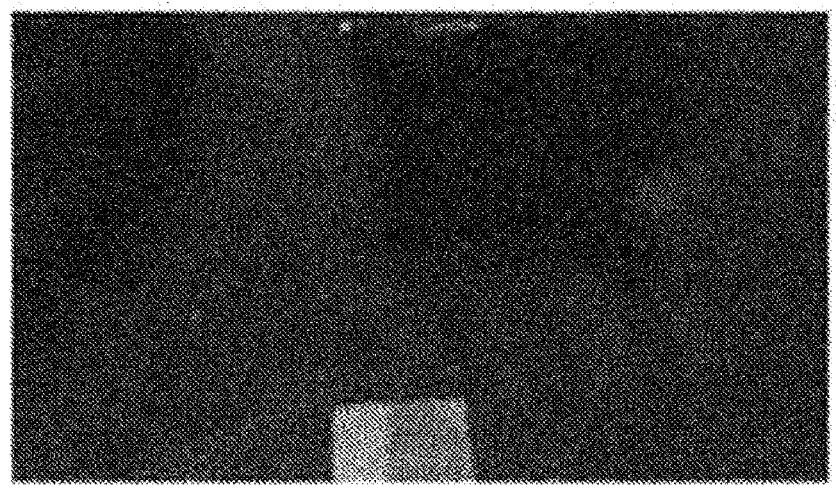
Figure 18:
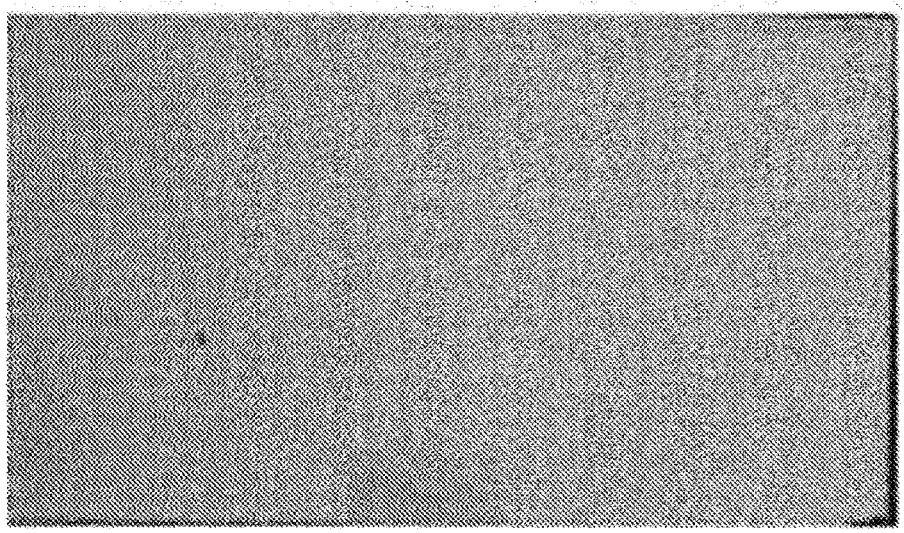

FIG. 17 is a photograph in an initial state (state of no voltage application), and FIG. 18 is a photograph measured in a transmission state (40V voltage applied). It can be confirmed from the photographs that defects such as orientation irregularities are not observed. In addition, it could be confirmed that the transmittance in the initial state measured using a haze meter (NDH5000SP, Sekos) was about 0.25% level, and the transmittance in the transmission state was about 25.5%, where the transparent mode and the black mode were effectively implemented therebetween.

Example 12

A light modulation device was manufactured in the same manner as in Example 11, except that lamination was performed at about 80° C.

After manufacturing the light modulation device as above, the manufactured light modulation device was placed on the backlight, and defects such as irregularities were confirmed through photographing.

Figure 19:
Figure 20:
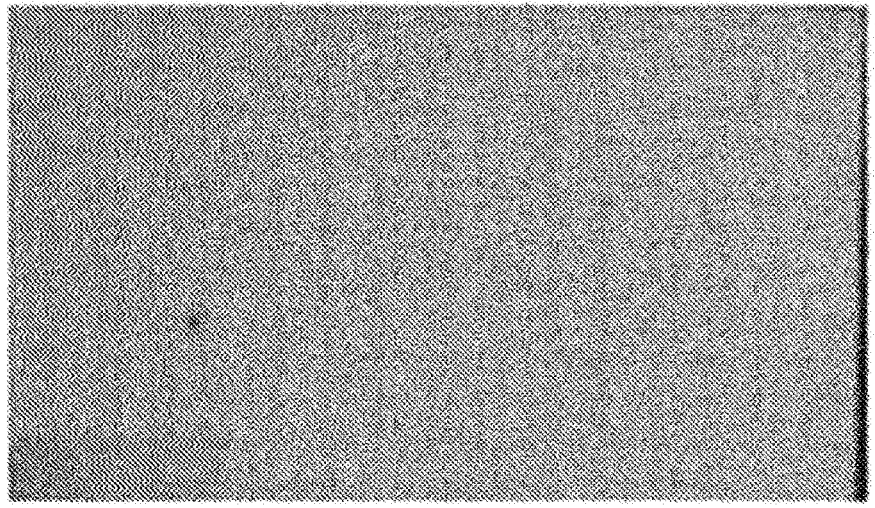

FIG. 19 is a photograph in an initial state (state of no voltage application), and FIG. 20 is a photograph measured in a transmission state (40V voltage applied). It can be confirmed from the photographs that defects such as orientation irregularities are not observed. In addition, it could be confirmed that the transmittance in the initial state measured using a haze meter (NDH5000SP, Sekos) was about 0.25% level, and the transmittance in the transmission state was about 24.5% level, where the transparent mode and the black mode were effectively implemented therebetween.

The invention claimed is:

1. A method for manufacturing a light modulation device, comprising:
    laminating a first substrate and a second substrate wherein the first and second substrates are laminated such that their first surfaces face each other;
    wherein a pressure-sensitive adhesive layer or adhesive layer is formed on a first surface of the first substrate,
    wherein a spacer is formed on a first surface of the second substrate, and
    performing heat treatment before, after or during the lamination,
    wherein the heat treatment is performed before the lamination is performed on at least the first substrate at a temperature of 80° C. or more,
    wherein the lamination of the first and second substrates is performed during the heat treatment is performed at a temperature in a range of more than 50° C. and less than 90° C.,
    wherein the heat treatment is performed after the lamination is performed on the first and second substrates at a temperature of 60° C. or more, and
    wherein the heat treatment is performed after the pressure-sensitive adhesive layer or adhesive layer is cured.

2. The method according to claim 1, wherein the heat treatment is performed before the lamination is performed for 30 seconds or more.

3. The method according to claim 1, wherein the heat treatment is performed after the lamination is performed for 30 seconds or more.

4. The method according to claim 1, wherein the pressure-sensitive adhesive layer or adhesive layer is a silicone pressure-sensitive adhesive layer or adhesive layer.

5. The method according to claim 1, wherein liquid crystal compounds are disposed between the first and second substrate to be laminated, or the liquid crystal compounds are injected between the first and second substrates after laminating the first and second substrates.

6. The method according to claim 5, wherein a chiral dopant is further present between the first and second substrates to be laminated, or the chiral dopant is injected between the first and second substrates after laminating the first and second substrates.

7. The method according to claim 6, wherein the first and second substrates are laminated so that a ratio (d/p) of an interval (d) between the first and second substrates relative to a chiral pitch (p) formed by the chiral dopant is less than 1.

8. The method according to claim 1, further comprising disposing a polarization layer on a second surface of the first substrate or a second surface of the second substrate.

9. The method according to claim 1, further comprising disposing two polarization layers on a second surface of the first substrate and a second surface of the second substrate, wherein the disposing of the polarization layers is performed such that absorption axes of the polarization layers on the second surface of the first substrate and the second surface of the second substrate are perpendicular or parallel to each other.

* * * * *